(12) United States Patent
Vladislav et al.

(10) Patent No.: US 9,213,943 B2
(45) Date of Patent: Dec. 15, 2015

(54) PARAMETER INFERENCE METHOD, CALCULATION APPARATUS, AND SYSTEM BASED ON LATENT DIRICHLET ALLOCATION MODEL

(71) Applicant: Huawei Technologies Co., Ltd., Shenzhen (CN)

(72) Inventors: Kopylov Vladislav, Shenzhen (CN); Liufei Wen, Shenzhen (CN); Guangyu Shi, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 14/153,257

(22) Filed: Jan. 13, 2014

(65) Prior Publication Data

US 2014/0129510 A1    May 8, 2014

Related U.S. Application Data

(63) Continuation of application No. PCT/CN2011/077097, filed on Jul. 13, 2011.

(51) Int. Cl.
*G06N 5/04* (2006.01)
*G06F 17/30* (2006.01)
*G06K 9/62* (2006.01)

(52) U.S. Cl.
CPC .......... *G06N 5/048* (2013.01); *G06F 17/30011* (2013.01); *G06K 9/6218* (2013.01)

(58) Field of Classification Search
CPC .................................................... G06N 5/043
USPC .......................................................... 706/52
See application file for complete search history.

(56) References Cited

U.S. PATENT DOCUMENTS

| 2007/0118498 A1 | 5/2007 | Song et al. |
| 2008/0319974 A1 | 12/2008 | Ma et al. |
| 2009/0089036 A1 | 4/2009 | Shi et al. |

FOREIGN PATENT DOCUMENTS

| CN | 101399708 A | 4/2009 |
| CN | 101587493 A | 11/2009 |
| CN | 101710333 A | 5/2010 |

OTHER PUBLICATIONS

Newman et al ("Distributed Inference for Latent Dirichlet Allocation" 2007).*

(Continued)

*Primary Examiner* — Lut Wong
(74) *Attorney, Agent, or Firm* — Conley Rose, P.C.; Grant Rodolph; Nicholas K. Beaulieu (57) ABSTRACT

A parameter inference method to solve a problem that precision of a Latent Dirichlet Allocation model is poor is provided. The method includes: calculating a Latent Dirichlet Allocation model according to a preset initial first hyperparameter, a preset initial second hyperparameter, a preset initial number of topics, a preset initial count matrix of documents and topics, and a preset initial count matrix of topics and words to obtain probability distributions; obtaining the number of topics, a first hyperparameter, and a second hyperparameter that maximize log likelihood functions of the probability distributions; and determining whether the number of topics, the first hyperparameter, and the second hyperparameter converge, and if not, putting the number of topics, the first hyperparameter, and the second hyperparameter into the Latent Dirichlet Allocation model until the optimal number of topics, an optimal first hyperparameter, and an optimal second hyperparameter that maximize the log likelihood functions of the probability distributions.

5 Claims, 7 Drawing Sheets

Calculate a latent Dirichlet model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words — S201

Obtain, by using an expectation maximization algorithm, the number of topics, a first hyperparameter, and a second hyperparameter that maximize log likelihood functions of the probability distributions — S202

Determine whether the number of topics, the first hyperparameter, and the second hyperparameter converge, and if not, put the number of topics, the first hyperparameter, and the second hyperparameter into the latent Dirichlet model for calculation until the optimal number of topics, an optimal first hyperparameter, and an optimal second hyperparameter that maximize the log likelihood functions of the probability distributions converge, and output the probability distributions, the optimal number of topics, the optimal first hyperparameter, and the optimal second hyperparameter that are eventually obtained — S203

(56) References Cited

OTHER PUBLICATIONS

Asuncion et al ("Asynchronous Distributed Estimation of Topic Models for Document Analysis" Mar. 18, 2010).*

Foreign Communication From a Counterpart Application, PCT Application No. PCT/CN2011/077097, English Translation of Chinese Search Report dated Apr. 26, 2012, 2 pages.

Foreign Communication From a Counterpart Application, PCT Application No. PCT/CN2011/077097, English Translation of Chinese Written Opinion dated Apr. 26, 2012, 10 pages.

Partial English Translation and Abstract of Chinese Patent Application No. CN101710333, Aug. 13, 2013, 13 pages.

Wang, Y., et al., "PLDA: Parallel Latent Dirichlet Allocation for Large-Scale Applications," AAIM '09 Proceedings of the 5th International Conference on Algorithmic Aspects in Information and Management, 2009, 14 pages.

Jaun, C., et al., "A Method of Adaptively Selecting Best LDA Model Based on Density," vol. 31, No. 10, China Academic Journal Electronic Publishing House, Chinese Journal of Computers, Oct. 31, 2008, 8 pages.

* cited by examiner

FIG. 1

Calculate a latent Dirichlet model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words ⟵ S201

Obtain, by using an expectation maximization algorithm, the number of topics, a first hyperparameter, and a second hyperparameter that maximize log likelihood functions of the probability distributions ⟵ S202

Determine whether the number of topics, the first hyperparameter, and the second hyperparameter converge, and if not, put the number of topics, the first hyperparameter, and the second hyperparameter into the latent Dirichlet model for calculation until the optimal number of topics, an optimal first hyperparameter, and an optimal second hyperparameter that maximize the log likelihood functions of the probability distributions converge, and output the probability distributions, the optimal number of topics, the optimal first hyperparameter, and the optimal second hyperparameter that are eventually obtained ⟵ S203

PARAMETER INFERENCE METHOD, CALCULATION APPARATUS, AND SYSTEM BASED ON LATENT DIRICHLET ALLOCATION MODEL

CROSS-REFERENCE TO RELATED APPLICATION

This application is a continuation of International Application No. PCT/CN2011/077097, filed on Jul. 13, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of information retrieval, and in particular, to a parameter inference method, calculation apparatus, and system based on a Latent Dirichlet Allocation model.

BACKGROUND

With the rapid development of the Internet, information on the Internet increases exponentially. For such a huge number of information resources, how to obtain required information effectively and quickly becomes more and more important for people. To improve quality and efficiency of information retrieval of users, many powerful information retrieval tools such as search engines appear one after another. Search engines bring great convenience to people; however, it turns out that search technologies in which a keyword is used as a basic indexing unit have many defects. In one aspect, too many results are returned for any keyword submitted by a user, among which only a small part of information is what the user actually needs, causing that the user has to spend a considerable amount of time in manually filtering these results; in another aspect, many documents related to a search topic may not include a keyword input by the user, resulting in that these documents cannot be found by a search engine.

Performing automatic classification on information is an effective approach to solve the foregoing problem, which can significantly solve problems of heterogeneous and disorderly information on the Internet, so as to narrow a search range, increase a retrieval speed, and improve a query result. Because currently, most information on the Internet appears in a form of a document, such as electronic mail (e-mail), electronic magazine, technical report, news, and online library, methods and technologies of document classification become the most important research focuses in the field of information retrieval.

A main task of document classification is to automatically determine an associated category according to document content. Currently, statistics-based and machine learning-based document classification methods are the most used by people. A common model of Bayesian classification, one of the statistics-based document classification methods, is a Latent Dirichlet Allocation model.

The Latent Dirichlet Allocation model is a probability generation model and can be used to identify latent topic information in a large-sized document set or corpus. The Latent Dirichlet Allocation model uses a bag-of-words method, in which each document is regarded as a word frequency vector, so that document information is changed into digital information that can be easily modeled. Each document represents a probability distribution formed by some topics, and each topic represents a probability distribution formed by many words.

For each document in a corpus, the Latent Dirichlet Allocation defines the following generation process:

(1) for each document, extracting a topic from a topic distribution;

(2) extracting a word in a word distribution corresponding to the extracted topic; and (3) repeating the process until every word in the document is traversed.

Figure 1:
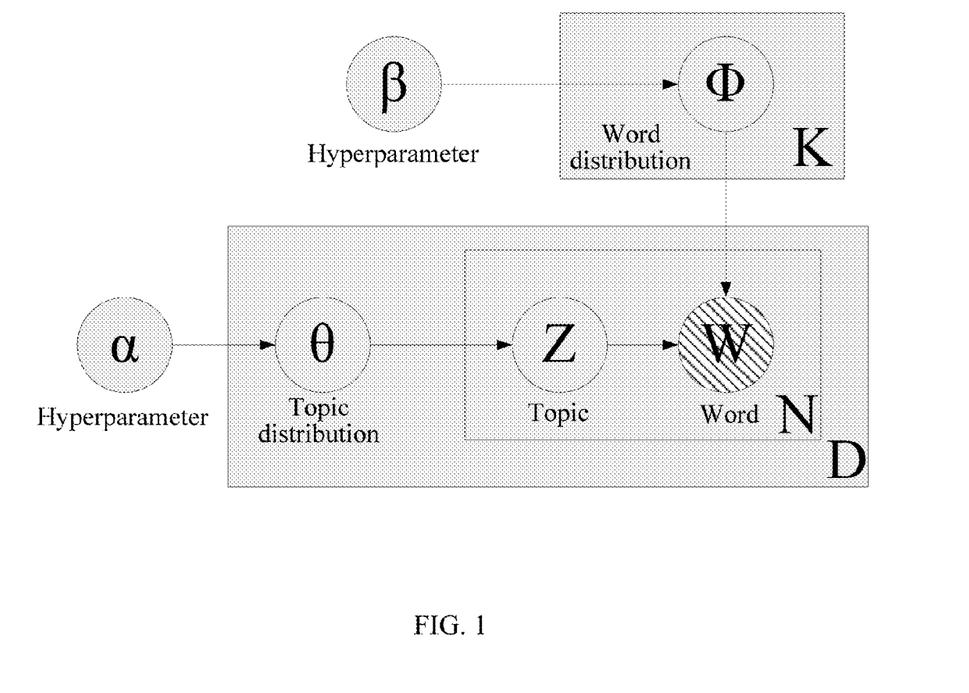
FIG. 1 is a graphical model representation diagram of a Latent Dirichlet Allocation model.

Referring to FIG. 1, in a more formal manner, each document in a corpus corresponds to one multinomial distribution of K topics (K is given in advance by using repeated experiments or another method), and the multinomial distribution is marked as $\theta$. Each topic corresponds to one multinomial distribution of V words in a vocabulary, and the multinomial distribution is marked as $\Phi$. $\theta$ and $\Phi$ each have one Dirichlet prior distribution with hyperparameters $\alpha$ and $\beta$. For each word in one document d, a topic Z is extracted from the multinomial distribution $\theta$ corresponding to the document, and then a word $\omega$ is extracted from the multinomial distribution $\Phi$ corresponding to the topic Z. A document D is generated by repeating the process Nd times, where Nd is the total number of words of the document D. In FIG. 1, a shaded circle represents an observable variable, an unshaded circle represents a latent variable, an arrow represents a condition dependency between two variables, and a box represents repeated sampling, where the number of times of repetition is shown at the lower right corner of the box.

The Latent Dirichlet Allocation model has two parameters that need to be inferred. One is a "document-topic" distribution $\theta$, and the other is a distribution $\Phi$ of K "topic-words". By learning these two parameters, a topic in which a document author is interested and proportions of topics covered in each document can be known.

Through actual calculation, it can be found that, for large-sized document data, although the Latent Dirichlet Allocation model can simulate a correlation between a topic and a word in a document, it is required to manually specify the optimal number of topics K in advance according to experience, and the input number of topics K has a significant impact on precision of a model to be solved. Therefore, how to choose the optimal number of topics K is still a difficult problem.

SUMMARY

Embodiments of the present invention provide a parameter inference method, calculation apparatus, and system based on a Latent Dirichlet Allocation model, so as to solve a problem in which solution precision of a Latent Dirichlet Allocation model is poor because the manually input number of topics is inaccurate.

In order to achieve the foregoing objectives, the embodiments of the present invention adopt the following technical solutions.

In one aspect, a parameter inference method based on a Latent Dirichlet Allocation model is provided and includes: calculating a Latent Dirichlet Allocation model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words; obtaining, by using an expectation maximization algorithm, a first hyperparameter, a second hyperparameter, and the number of topics that maximize log likelihood functions of the probability distributions; and determining whether the first hyperparameter, the second hyperparameter, and the number of topics converge, and if not, putting the first hyperparameter, the second hyperparameter, and the number of topics into the Latent Dirichlet Allocation model for calculation until an optimal first hyperparameter, an optimal second hyperparameter, and the optimal number of topics that maximize the log likelihood functions of the probability distributions converge, and outputting the probability distributions, the optimal first hyperparameter, the optimal second hyperparameter, and the optimal number of topics that are eventually obtained.

In one aspect, a parameter inference calculation apparatus based on a Latent Dirichlet Allocation model is provided and includes: a Latent Dirichlet Allocation model calculation unit configured to calculate a Latent Dirichlet Allocation model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words; a parameter estimation unit configured to obtain, by using an expectation maximization algorithm, a first hyperparameter, a second hyperparameter, and the number of topics that maximize log likelihood functions of the probability distributions; and a determination and output unit configured to determine whether the first hyperparameter, the second hyperparameter, and the number of topics converge, and if not, put the first hyperparameter, the second hyperparameter, and the number of topics into the Latent Dirichlet Allocation model for calculation until an optimal first hyperparameter, an optimal second hyperparameter, and the optimal number of topics that maximize the log likelihood functions of the probability distributions converge, and output the probability distributions, the optimal first hyperparameter, the optimal second hyperparameter, and the optimal number of topics that are eventually obtained.

In one aspect, a parameter inference calculation system based on a Latent Dirichlet Allocation model is provided and includes: a master calculation apparatus configured to segment a document set into a plurality of document subsets; set an initial first hyperparameter, an initial second hyperparameter, an initial number of topics, an initial global count matrix of documents and topics, and an initial global count matrix of topics and words; send each document subset of a plurality of document subsets, the initial first hyperparameter, the initial second hyperparameter, the initial number of topics, the initial global count matrix of documents and topics, and the initial global count matrix of topics and words to each slave calculation apparatus of a plurality of slave calculation apparatuses correspondingly; receive a local count matrix of documents and topics and a local count matrix of topics and words that are returned by each slave calculation apparatus, and perform merging to obtain a global count matrix of documents and topics and a global count matrix of topics and words; determine whether a process of solving, by each slave calculation apparatus, the Latent Dirichlet Allocation model and updating the local count matrix of documents and topics and the local count matrix of topics and words converges; and if not, send the global count matrix of documents and topics and the global count matrix of topics and words to each slave calculation apparatus correspondingly for calculation, and continue to update the local count matrix of documents and topics and the local count matrix of topics and words until the process of calculating the Latent Dirichlet Allocation model and updating the local count matrix of documents and topics and the local count matrix of topics and words converges, and output the global count matrix of documents and topics and global count matrix of topics and words that are eventually obtained; obtain, through calculation, a probability distribution between documents and topics and a probability distribution between topics and words according to the global count matrix of documents and topics and the global count matrix of topics and words; obtain, by using an expectation maximization algorithm, a first hyperparameter, a second hyperparameter, and the number of topics that maximize log likelihood functions of the probability distributions; determine whether the first hyperparameter, the second hyperparameter, and the number of topics converge, and if not, send the first hyperparameter, the second hyperparameter, and the number of topics to each slave calculation apparatus until an optimal first hyperparameter, an optimal second hyperparameter, and the optimal number of topics that maximize the log likelihood functions of the probability distributions converge, and output the probability distributions, the optimal first hyperparameter, the optimal second hyperparameter, and the optimal number of topics that are eventually obtained; and a plurality of slave calculation apparatuses configured to receive the document subset, the initial first hyperparameter, the initial second hyperparameter, the initial number of topics, the initial global count matrix of documents and topics, and the initial global count matrix of topics and words that are sent by the master calculation apparatus, calculate the Latent Dirichlet Allocation model, update the local count matrix of documents and topics and the local count matrix of topics and words, and return the local count matrix of documents and topics and the local count matrix of topics and words to the master calculation apparatus; receive the global count matrix of documents and topics and the global count matrix of topics and words that are sent by the master calculation apparatus and put them into the Latent Dirichlet Allocation model for local calculation; receive the first hyperparameter, the second hyperparameter, the number of topics and put them into the Latent Dirichlet Allocation model for local calculation.

In the parameter inference method, calculation apparatus, and system based on a Latent Dirichlet Allocation model according to the embodiments of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

BRIEF DESCRIPTION OF THE DRAWINGS

To describe the technical solutions in the embodiments of the present invention or in the prior art more clearly, the following briefly introduces accompanying drawings required for describing the embodiments or the prior art. The accompanying drawings in the following description show merely some embodiments of the present invention, and persons of ordinary skill in the art may further obtain other drawings according to these accompanying drawings without creative efforts.

DETAILED DESCRIPTION

The following clearly describes the technical solutions in the embodiments of the present invention with reference to the accompanying drawings in the embodiments of the present invention. The embodiments to be described are merely a part rather than all of the embodiments of the present invention. All other embodiments obtained by persons of ordinary skill in the art based on the embodiment of the present invention without creative efforts shall fall within the protection scope of the present invention.

In the following embodiments, "a first hyperparameter" refers to a hyperparameter of a "document-topic" distribution, and "a second hyperparameter" refers to a hyperparameter of a distribution of "topic-words" of "the number of topics". By learning the "document-topic" distribution and the "topic-word" distribution in a Latent Dirichlet Allocation result, a topic in which a document author is interested and proportions of topics covered in each document can be known.

Figure 2:
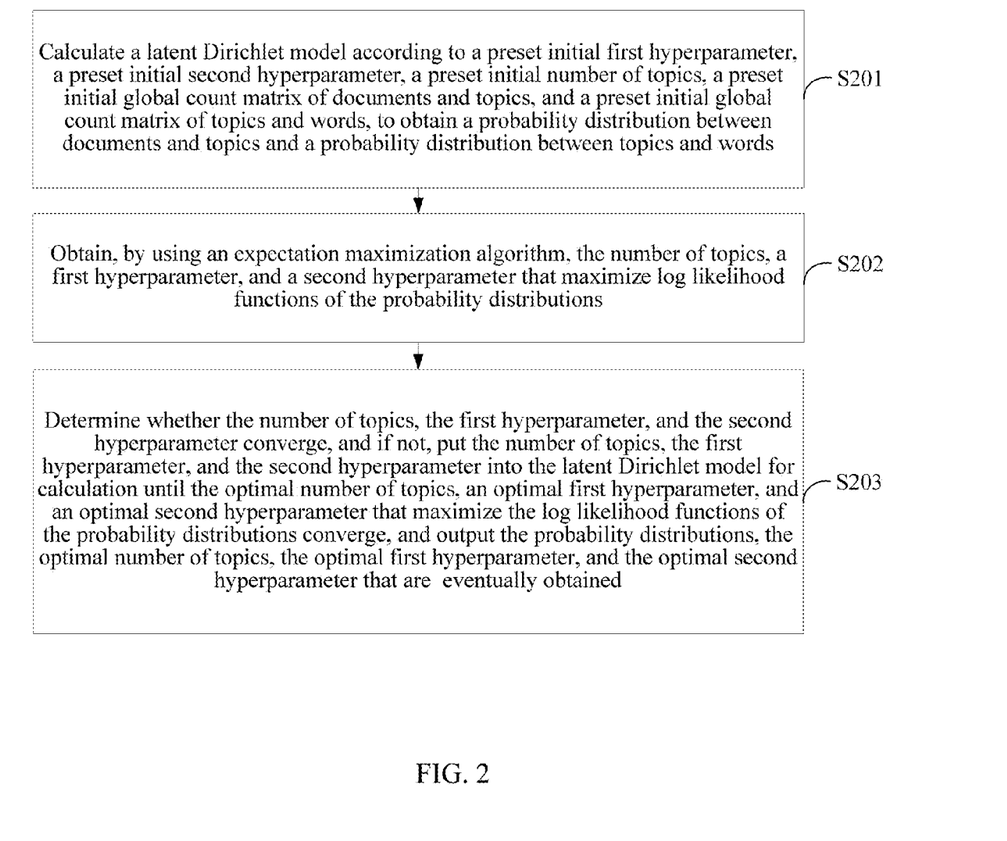
FIG. 2 is a flow chart of a parameter inference method based on a Latent Dirichlet Allocation model according to the present invention.

As shown in FIG. 2, a parameter inference method based on a Latent Dirichlet Allocation model according to an embodiment of the present invention includes the following steps.

S201: Calculate a Latent Dirichlet Allocation model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words.

S202: Obtain, by using an expectation maximization algorithm, the number of topics, a first hyperparameter, and a second hyperparameter that maximize log likelihood functions of the probability distributions.

S203: Determine whether the number of topics, the first hyperparameter, and the second hyperparameter converge, and if not, put the number of topics, the first hyperparameter, and the second hyperparameter into the Latent Dirichlet Allocation model for calculation until an optimal number of topics, an optimal first hyperparameter, and an optimal second hyperparameter that maximizes the log likelihood functions of the probability distributions converge, and output the probability distributions, the optimal number of topics, the optimal first hyperparameter, and the optimal second hyperparameter that are eventually obtained.

In the parameter inference method based on a Latent Dirichlet Allocation model according to the embodiment of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

Figure 3A:
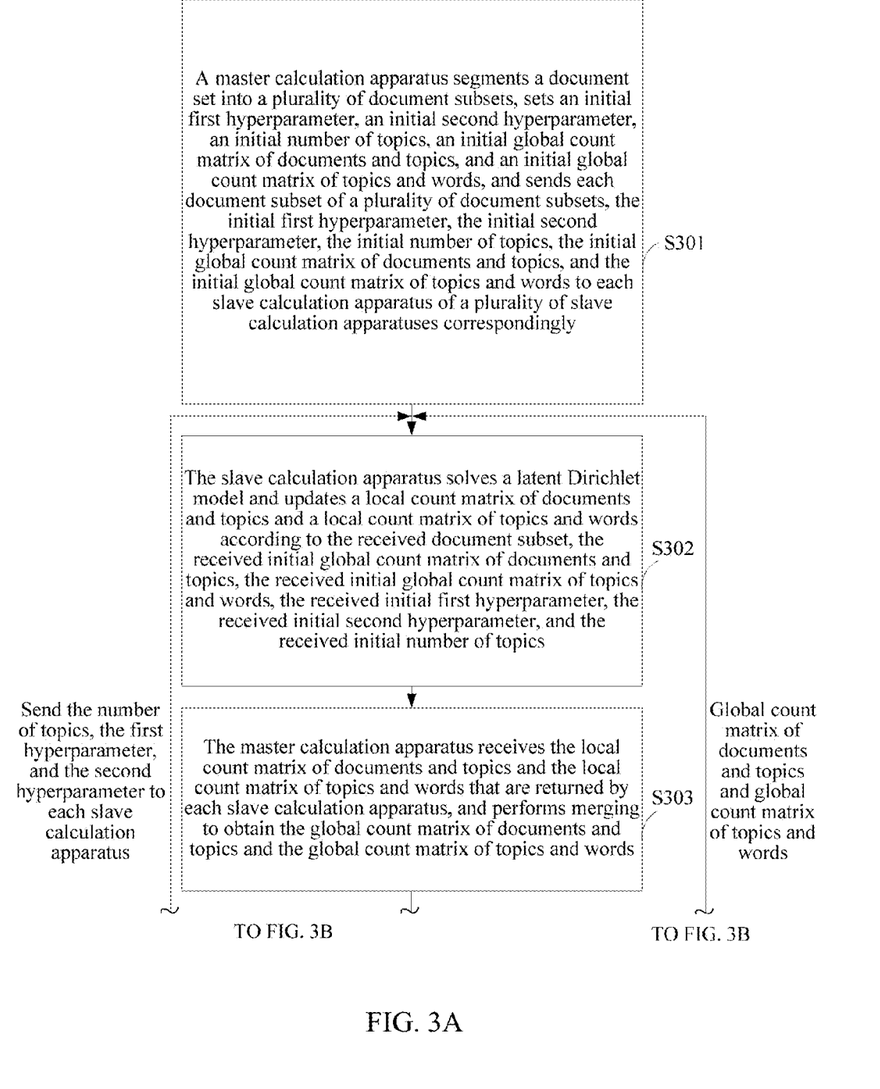
FIG. 3A and FIG. 3B is a flow chart of a parameter inference method based on a Latent Dirichlet Allocation model according to another embodiment of the present invention.
Figure 3B:
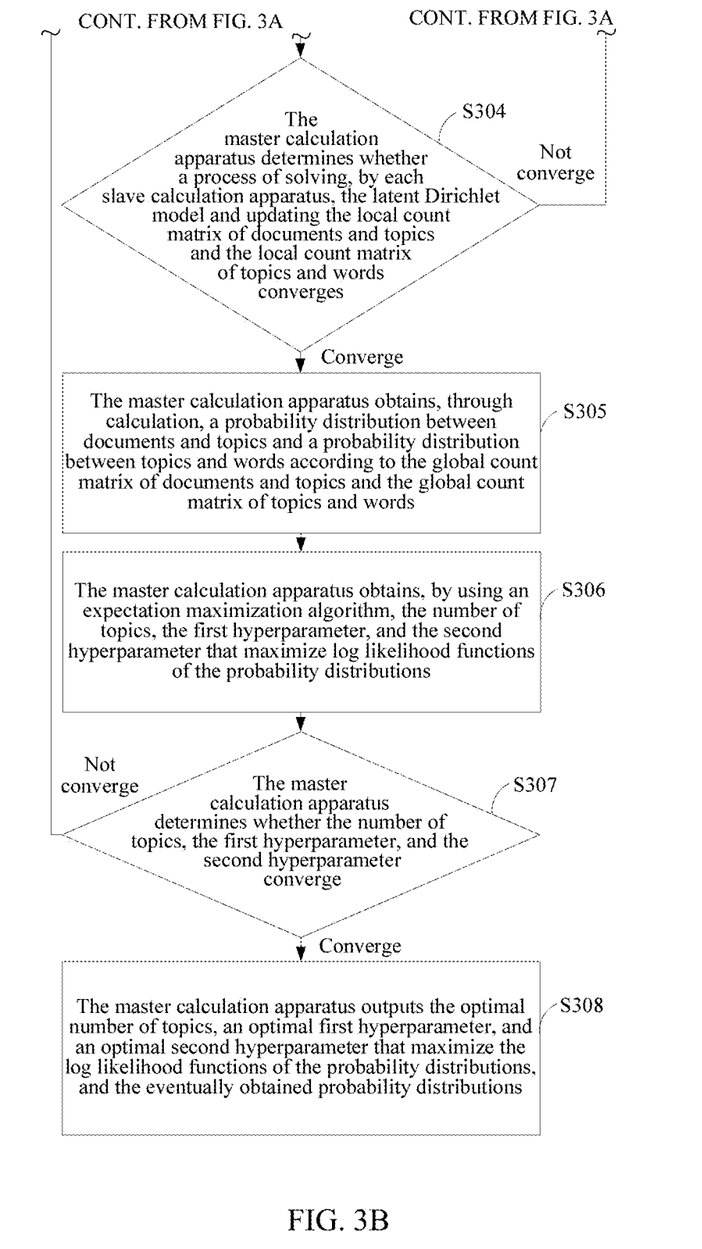

As shown in FIG. 3A and FIG. 3B, another parameter inference method based on a Latent Dirichlet Allocation model according to another embodiment of the present invention includes:

S301: A master calculation apparatus segments a document set into a plurality of document subsets, sets an initial first hyperparameter, an initial second hyperparameter, an initial number of topics, an initial global count matrix of documents and topics, and an initial global count matrix of topics and words, and sends each document subset of a plurality of document subsets, the initial first hyperparameter, the initial second hyperparameter, the initial number of topics, the initial global count matrix of documents and topics, and the initial global count matrix of topics and words to each slave calculation apparatus of a plurality of slave calculation apparatuses correspondingly.

S302: The slave calculation apparatus solves a Latent Dirichlet Allocation model and updates a local count matrix of documents and topics and a local count matrix of topics and words according to the received document subset, the received initial global count matrix of documents and topics, the received initial global count matrix of topics and words, the received initial first hyperparameter, the received initial second hyperparameter, and the received initial number of topics.

S303: The master calculation apparatus receives the local count matrix of documents and topics and the local count matrix of topics and words that are returned by each slave calculation apparatus, and performs merging to obtain a global count matrix of documents and topics and a global count matrix of topics and words.

S304: The master calculation apparatus determines whether a process of solving, by each slave calculation apparatus, the Latent Dirichlet Allocation model and updating the local count matrix of documents and topics and the local count matrix of topics and words converges, and if not, send the global count matrix of documents and topics and the global count matrix of topics and words to each slave calculation apparatus, and perform step S302. If yes, perform step S305.

S305: The master calculation apparatus obtains, through calculation, a probability distribution between documents and topics and a probability distribution between topics and words according to the global count matrix of documents and topics and the global count matrix of topics and words.

S306: The master calculation apparatus obtains, by using an expectation maximization algorithm, the number of topics, a first hyperparameter, and a second hyperparameter that maximize log likelihood functions of the probability distributions.

S307: The master calculation apparatus determines whether the number of topics, the first hyperparameter, and the second hyperparameter converge. If not, perform step S302. In this case, the master calculation apparatus sends the number of topics, the first hyperparameter, and the second hyperparameter to each slave calculation apparatus, so that each slave calculation apparatus puts the number of topics, the first hyperparameter, and the second hyperparameter into the Latent Dirichlet Allocation model for local calculation. If yes, perform step S308.

S308: The master calculation apparatus outputs an optimal number of topics, an optimal first hyperparameter, and an optimal second hyperparameter that maximize the log likelihood functions of the probability distributions, and the eventually obtained probability distributions.

It should be noted that, in S302, the solving the Dirichlet model may be implemented by adopting a Gibbs sampling method and the like; in S305, the obtaining, through calculation by the master calculation apparatus, the probability distribution between documents and topics and the probability distribution between topics and words according to the global count matrix of documents and topics and the global count matrix of topics and words may be implemented by adopting a Bayesian inference method and the like.

In the parameter inference method based on a Latent Dirichlet Allocation model according to the embodiment of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

Figure 4:
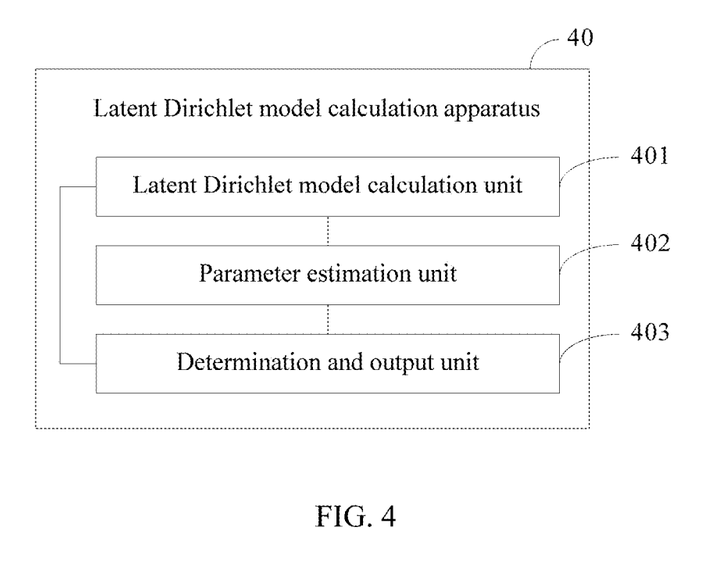
FIG. 4 is a schematic structural diagram of a parameter inference calculation apparatus based on a Latent Dirichlet Allocation model according to an embodiment of the present invention.

As shown in FIG. 4, a parameter inference calculation apparatus 40 based on a Latent Dirichlet Allocation model according to the present invention includes: a Latent Dirichlet Allocation model calculation unit 401 configured to calculate a Latent Dirichlet Allocation model according to a preset initial first hyperparameter, a preset initial second hyperparameter, a preset initial number of topics, a preset initial global count matrix of documents and topics, and a preset initial global count matrix of topics and words, to obtain a probability distribution between documents and topics and a probability distribution between topics and words; a parameter estimation unit 402 configured to obtain, by using an expectation maximization algorithm, the number of topics, a first hyperparameter, and a second hyperparameter that maximize log likelihood functions of the probability distributions; and a determination and output unit 403 configured to determine whether the number of topics, the first hyperparameter, and the second hyperparameter converge, and if not, put the number of topics, the first hyperparameter, and the second hyperparameter into the Latent Dirichlet Allocation model for calculation until an optimal number of topics, an optimal first hyperparameter, and an optimal second hyperparameter that maximize the log likelihood functions of the probability distributions converge, and output the probability distributions, the optimal number of topics, the optimal first hyperparameter, and the optimal second hyperparameter that are eventually obtained.

In the parameter inference calculation apparatus based on a Latent Dirichlet Allocation model according to the embodiment of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

Figure 5:
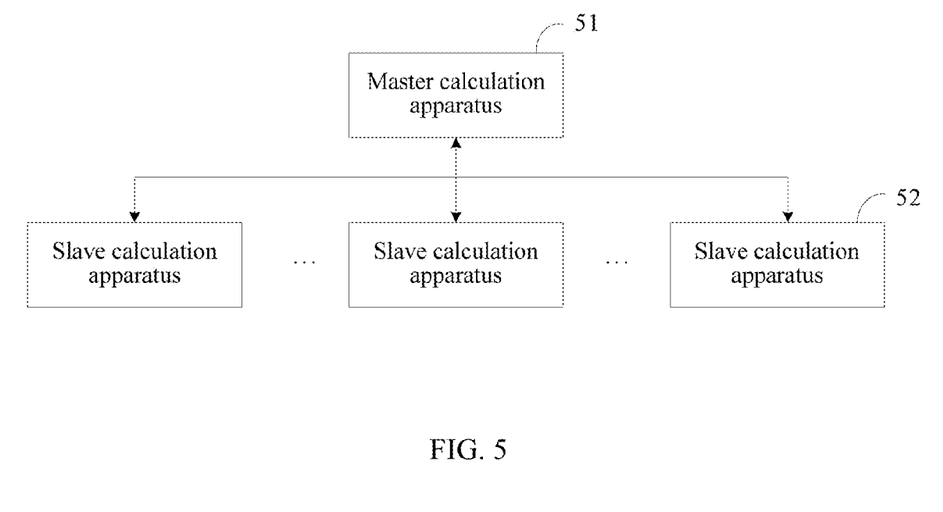
FIG. 5 is a schematic structural diagram of a parameter inference calculation system based on a Latent Dirichlet Allocation model according to an embodiment of the present invention.

As shown in FIG. 5, a parameter inference calculation system based on a Latent Dirichlet Allocation model according to an embodiment of the present invention includes a master calculation apparatus 51 and a plurality of slave calculation apparatuses 52, that is, a distributed parallel calculation system, and the master calculation apparatus 51 may be separately connected to the plurality of slave calculation apparatuses 52 in a distributed and parallel manner.

The master calculation apparatus 51 is configured to segment a document set into a plurality of document subsets; set an initial first hyperparameter, an initial second hyperparameter, an initial number of topics, an initial global count matrix of documents and topics, and an initial global count matrix of topics and words; send each document subset of a plurality of document subsets, the initial first hyperparameter, the initial second hyperparameter, the initial number of topics, the initial global count matrix of documents and topics, and the initial global count matrix of topics and words to each slave calculation apparatus 52 of a plurality of slave calculation apparatuses 52 correspondingly; receive a local count matrix of documents and topics and a local count matrix of topics and words that are returned by each slave calculation apparatus 52, and perform merging to obtain a global count matrix of documents and topics and a global count matrix of topics and words; determine whether a process of solving, by each slave calculation apparatus 52, the Latent Dirichlet Allocation model and updating the local count matrix of documents and topics and the local count matrix of topics and words converges; and if not, send the global count matrix of documents and topics and the global count matrix of topics and words to each slave calculation apparatus 52 correspondingly for calculation, and continue to update the local count matrix of documents and topics and the local count matrix of topics and words until the process of solving the Latent Dirichlet Allocation model and updating the local count matrix of documents and topics and the local count matrix of topics and words converges, and output the global count matrix of documents and topics and global count matrix of topics and words that are eventually obtained; obtain, through calculation, a probability distribution between documents and topics and a probability distribution between topics and words according to the global count matrix of documents and topics and the global count matrix of topics and words; obtain, by using an expectation maximization algorithm, a first hyperparameter, a second hyperparameter, and the number of topics that maximize log likelihood functions of the probability distributions; determine whether the number of topics, the first hyperparameter, and the second hyperparameter converge, and if not, send the number of topics, the first hyperparameter, and the second hyperparameter to each slave calculation apparatus 52 until an optimal number of topics, an optimal first hyperparameter, and an optimal second hyperparameter that maximize the log likelihood functions of the probability distributions converge, and output the probability distributions, the optimal number of topics, the optimal first hyperparameter, and the optimal second hyperparameter that are eventually obtained.

The slave calculation apparatus 52 is configured to receive the document subset, the initial first hyperparameter, the initial second hyperparameter, the initial number of topics, the initial global count matrix of documents and topics, and the initial global count matrix of topics and words that are sent by the master calculation apparatus 51, calculate the Latent Dirichlet Allocation model, update the local count matrix of documents and topics and the local count matrix of topics and words, and return the local count matrix of documents and topics and the local count matrix of topics and words to the master calculation apparatus 51; receive the global count matrix of documents and topics, and the global count matrix of topics and words that are sent by the master calculation apparatus 51 and put them into the Latent Dirichlet Allocation model for local calculation and update the local count matrix of documents and topics and the local count matrix of topics and words; receive the number of topics, the first hyperparameter, and the second hyperparameter that are sent by the master calculation apparatus 51 and put them into the Latent Dirichlet Allocation model for local calculation and update the local count matrix of documents and topics and the local count matrix of topics and words.

In the parameter inference calculation system based on a Latent Dirichlet Allocation model according to the embodiment of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

In addition, the parameter inference calculation system based on a Latent Dirichlet Allocation model according to the embodiment of the present invention adopts distributed and parallel calculation, thereby reducing calculation complexity on one machine and increasing a calculation speed.

Figure 6:
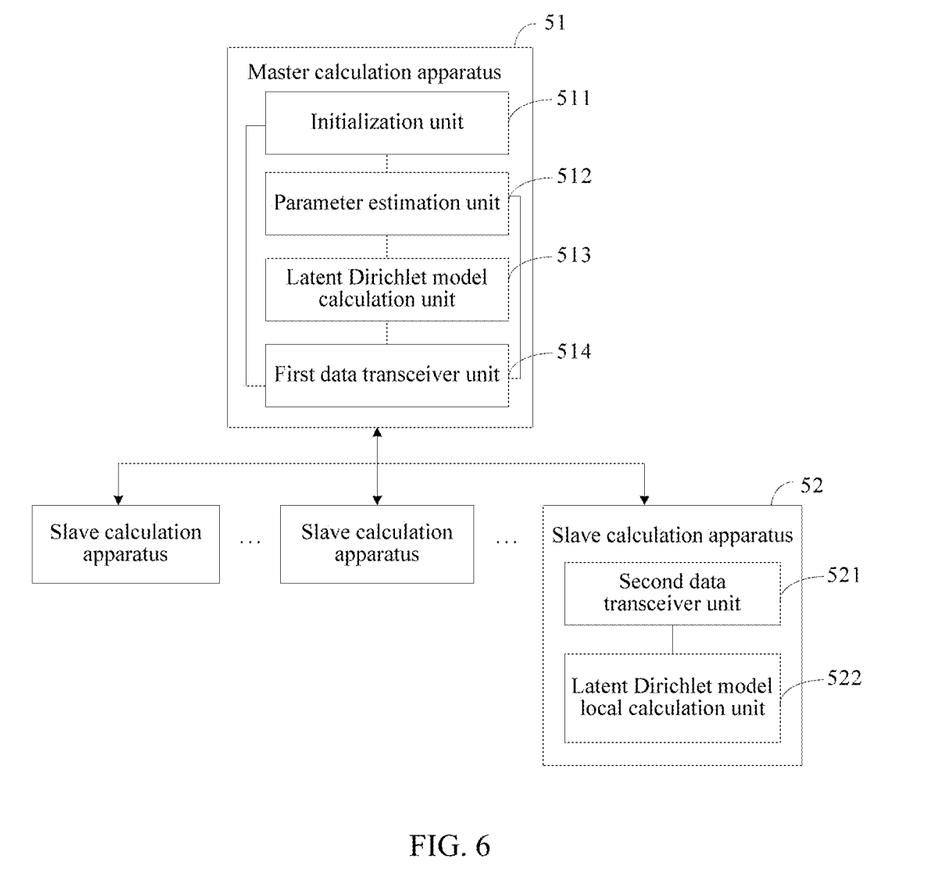
FIG. 6 is a schematic structural diagram of a parameter inference calculation system based on a Latent Dirichlet Allocation model according to another embodiment of the present invention.

Furthermore, as shown in FIG. 6, the master calculation apparatus 51 includes: an initialization unit 511 configured to segment the document set into a plurality of document subsets; and set the initial first hyperparameter, the initial second hyperparameter, the initial number of topics, the initial global count matrix of documents and topics, and the initial global count matrix of topics and words; a parameter estimation unit 512 configured to construct the log likelihood functions of the probability distributions; receive the number of topics, the first hyperparameter, and the second hyperparameter which are sent by a Latent Dirichlet Allocation model calculation unit 513, obtained by using the expectation maximization algorithm, and maximize the log likelihood functions of the probability distribution between documents and topics and the probability distribution between topics and words, determine whether the number of topics, the first hyperparameter, and the second hyperparameter converge; if not, send, through a first data transceiver unit 514, the number of topics, the first hyperparameter, and the second hyperparameter to the slave calculation apparatus 52 until the optimal number of topics, the optimal first hyperparameter, and the optimal second hyperparameter that maximize the log likelihood functions of the probability distributions converge, and output the probability distributions, the optimal number of topics, the optimal first hyperparameter, and the optimal second hyperparameter that are eventually obtained; the Latent Dirichlet Allocation model calculation unit 513 configured to merge a plurality of local count matrixes of documents and topics and local count matrixes of topics and words that are received through the first data transceiver unit 514 to obtain the global count matrix of documents and topics and the global count matrix of topics and words; determine whether the process of solving, by each slave calculation apparatus 52, the Latent Dirichlet Allocation model and updating the local count matrix of documents and topics and the local count matrix of topics and words converges; and if not, send, through the first data transceiver unit 514, the global count matrix of documents and topics and the global count matrix of topics and words to each slave calculation apparatus 52 correspondingly for calculation, and continue to update the local count matrix of documents and topics and the local count matrix of topics and words until the process of calculating the Latent Dirichlet Allocation model and updating the local count matrix of documents and topics and the local count matrix of topics and words converges, and output the global count matrix of documents and topics and global count matrix of topics and words that are eventually obtained; and obtain, through calculation, the probability distribution between documents and topics and the probability distribution between topics and words according to the global count matrix of documents and topics and the global count matrix of topics and words, and send the probability distribution between documents and topics and the probability distribution between topics and words to the parameter estimation unit 512; and the first data transceiver unit 514 configured to send each document subset of a plurality of document subsets, the initial first hyperparameter, the initial second hyperparameter, the initial number of topics, the initial global count matrix of documents and topics, and the initial global count matrix of topics and words to each slave calculation apparatus 52 of a plurality of slave calculation apparatuses 52 correspondingly; receive the local count matrix of documents and topics and the local count matrix of topics and words that are returned by each slave calculation apparatus 52, send the global count matrix of documents and topics and the global count matrix of topics and words to each slave calculation apparatus 52; and send the number of topics, the first hyperparameter, and the second hyperparameter that are sent by the parameter estimation unit 512 to each slave calculation apparatus 52.

The slave calculation apparatus 52 includes: a second data transceiver unit 521 configured to receive the document subset, the initial first hyperparameter, the initial second hyperparameter, the initial number of topics, the initial global count matrix of documents and topics, and the initial global count matrix of topics and words that are sent by the master calculation apparatus 51; send the global count matrix of documents and topics and the global count matrix of topics and words to the master calculation apparatus 51; and receive the number of topics, the first hyperparameter, and the second hyperparameter that are sent by the master calculation apparatus 51; and a Latent Dirichlet Allocation Allocation local calculation unit 522 configured to calculate the Latent Dirichlet Allocation model and perform update to obtain the local count matrix of documents and topics and the local count matrix of topics and words according to the document subset, the initial first hyperparameter, the initial second hyperparameter, the initial number of topics, the initial global count matrix of documents and topics, and the initial global count matrix of topics and words that are received through the second data transceiver unit 521; put the global count matrix of documents and topics and the global count matrix of topics and words that are received through the second data transceiver unit 521 into the Latent Dirichlet Allocation model for local calculation and update the local count matrix of documents and topics and the local count matrix of topics and words; and put the number of topics, the first hyperparameter, and the second hyperparameter that are received through the second data transceiver unit 521 into the Latent Dirichlet Allocation model for local calculation and update the local count matrix of documents and topics and the local count matrix of topics and words.

FIG. 6 shows a parameter inference calculation system based on a Latent Dirichlet Allocation model according to another embodiment of the present invention. A master calculation apparatus 51 includes an initialization unit 511, a parameter estimation unit 512, a Latent Dirichlet Allocation calculation unit 513, and a first data transceiver unit 514. A slave calculation apparatus 52 includes a second data transceiver unit 521 and a Latent Dirichlet Allocation local calculation unit 522.

Main functions of the initialization unit 511 include document segmentation and parameter initialization. In an initialization phase, the initialization unit 511 segments a document set including M documents into P subsets and establishes an index for each subset. To perform iteration, an initial global count matrix of documents and topics $C^{doc}$ and an initial global count matrix of topics and words $C^{word}$ are given, and meanwhile, an initial value is set for each parameter of a Latent Dirichlet Allocation model: $\alpha=\alpha_0$, $\beta=\beta_0$, and $K=K_0$, where $\alpha$ and $\beta$ are hyperparameters, and K is the number of topics.

The parameter estimation unit 512 is configured to establish a likelihood function, maximize the likelihood function, and update a parameter of the Latent Dirichlet Allocation model. Based on the Latent Dirichlet Allocation model, the parameter estimation unit 512 obtains, through the Latent Dirichlet Allocation calculation unit 513, a probability distribution p(Z|d) between documents and topics and a probability distribution p(W|Z) between topics and words, and establishes, according to the Bayesian Theory, a target likelihood function:

$$L(\alpha, \beta, K) = \sum_{d=1}^{M} \log p(w_d \mid \alpha, \beta, K).$$

By maximizing the target likelihood function $L(\alpha, \beta, K)$ model parameters $\alpha^{(n)}$, $\beta^{(n)}$, $K^{(n)}$ corresponding to this iteration are obtained, and it is determined whether iteration of parameter estimation is ended; if the iteration is not ended, the model parameters $\alpha=\alpha^{(n)}$, $\beta=\beta^{(n)}$ and $K=K^{(n)}$ are updated, and the updated model parameters are sent to each slave calculation apparatus 52 through the first data transceiver unit 514.

The Latent Dirichlet Allocation calculation unit 513 receives a local count matrix $C_{lp}^{doc}$ of documents and topics and a local count matrix $C_{lp}^{word}$ of topics and words that are obtained through calculation by each slave calculation apparatus 52 and forwarded by the first data transceiver unit 514, and performs merging to obtain the global count matrix $C^{doc}$ of documents and topics and the global count matrix $C^{word}$ of topics and words. The Latent Dirichlet Allocation calculation unit 513 determines whether a process of solving, by each slave calculation apparatus 52, the Latent Dirichlet Allocation model and updating the local count matrix $C_{lp}^{doc}$ of documents and topics and the local count matrix $C_{lp}^{word}$ of topics and words converges; and if not, sends the global count matrix $C^{doc}$ of documents and topics and the global count matrix $C^{word}$ of topics and words to each slave calculation apparatus 52 through the first data transceiver unit 514 correspondingly, continues to update the local count matrix $C_{lp}^{doc}$ of documents and topics and the local count matrix $C_{lp}^{word}$ of topics and words until the process of solving the Latent Dirichlet Allocation model and updating the local count matrix $C_{lp}^{doc}$ of documents and topics and the local count matrix $C_{lp}^{word}$ of topics and words converges; obtains, through calculation, the probability distribution p(Z|d) of documents and topics and the probability distribution p(W|Z) of topics and words according to the global count matrix $C_{doc}$ of documents and topics and the global count matrix $C^{word}$ of topics and words, and sends the probability distributions p(Z|d) and p(W|Z) and corresponding parameters K, $\alpha$ and $\beta$ to the parameter estimation unit 512.

In the initialization stage, the first data transceiver unit 514 sends each document subset $D^p$, the initialization parameters $\alpha=\alpha_0$, $\beta=\beta_0$ and $K=K_0$, the given initial global count matrix $C^{doc}$ of documents and topics and the initial global count matrix of topics and words to the corresponding slave calculation apparatus 52. In the parameter estimation stage, the first data transceiver unit 514 receives the global count matrix of documents and topics and the global count matrix of topics and words that are returned by each slave calculation apparatus 52 and sends them to each slave calculation apparatus 52, forwards them to the Latent Dirichlet Allocation calculation unit 513; sends the global count matrix $C^{doc}$ of documents and topics and the global count matrix $C^{word}$ of topics and words to each slave calculation apparatus 52; sends parameters $\alpha'$, $\beta'$, $K'$ updated by the parameter estimation unit 512 to each slave calculation apparatus 52.

A Latent Dirichlet Allocation local calculation unit 522 of the slave calculation apparatus 52, according to the Latent Dirichlet Allocation model parameters K, a and 13 and document data sent by the master calculation apparatus 51, samples a document subset corresponding to this calculation apparatus, assigns a new topic for each word in each document, updates $C_{lp}^{word}$ and $C_{lp}^{doc}$, ($C_{lp}^{word}$ and $C_{lp}^{doc}$ represent the count matrix of topics and words and the count matrix of documents and topics on each slave calculation apparatus 52 respectively), and sends, through the second data transceiver unit 521, the updated local count matrix $C_{lp}^{word}$ of topics and words and the updated local count matrix $C_{lp}^{doc}$ of documents and topics to the master calculation apparatus 51.

In the initialization stage, the second data transceiver unit 521 receives the corresponding document subset $D^p$, the initialization parameters $\alpha=\alpha_0$, $\beta=\beta_0$ and $K=K_0$, and the initial global count matrix $C^{doc}$ of documents and topics, and the initial global count matrix $C^{word}$ of topics and words that are sent by the master calculation apparatus 51. In the parameter estimation stage, the second data transceiver unit 521 receives model parameters $\alpha'$, $\beta'$, $K'$ updated through maximization likelihood estimation; receives the global count matrix $C^{doc}$ of documents and topics and the global count matrix $C^{word}$ of topics and words that are sent by the master calculation apparatus, and sends the local count matrix $C_{lp}^{word}$ of topics and words and the local count matrix $C_{lp}^{doc}$ of documents and topics that are obtained through calculation by the Latent Dirichlet Allocation local calculation unit 522 to the master calculation apparatus 51.

Main methods for solving the Latent Dirichlet Allocation model usually include a Gibbs sampling-based algorithm, a variational expectation maximum (variational EM) based algorithm, and an expectation-propagation algorithm. In the embodiment of the present invention, it is assumed that the Gibbs sampling solving algorithm is adopted, it is not limited to the Gibbs sampling algorithm.

A unit of the apparatus according to the embodiment of the present invention may be a processor, an application specific circuit, and the like.

In the parameter inference calculation system based on a Latent Dirichlet Allocation model according to the embodiment of the present invention, the number of topics, a first hyperparameter, and a second hyperparameter that maximize log likelihood functions of a probability distribution between documents and topics and a probability distribution between topics and words can be obtained through adaptively solving by using an expectation maximization algorithm, thereby avoiding the number of topics manually specified in advance according to experience and improving precision of a calculation result of a Latent Dirichlet Allocation model.

In addition, the parameter inference calculation system based on a Latent Dirichlet Allocation model according to the embodiment of the present invention adopts distributed and parallel calculation, thereby reducing calculation complexity on one machine and increasing a calculation speed.

The foregoing description is merely specific embodiments of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A parameter inference method based on a Latent Dirichlet Allocation model, comprising:

calculating the Latent Dirichlet Allocation model according to a preset initial first hyperparameter, a preset initial second hyperparameter, a preset initial number of topics a preset initial global count matrix of documents and topics, and a preset initial global count matrix of topics and words, to obtain a probability distribution between documents and topics and a probability distribution between topics and words;

obtaining, by using an expectation maximization algorithm, a first hyperparameter, a second hyperparameter, and the number of topics that maximize log likelihood functions of the probability distributions; and determining whether the first hyperparameter, the second hyperparameter, and the number of topics converge, and when the first hyperparameter and the second hyperparameter do not converge, putting the first hyperparameter, the second hyperparameter, and the number of topics into the Latent Dirichlet Allocation model for calculation until an optimal first hyperparameter, an optimal second hyperparameter, and an optimal number of topics that maximize the log likelihood functions of the probability distributions converge, and outputting the probability distributions, the optimal first hyperparameter, the optimal second hyperparameter, and the optimal number of topics that are eventually obtained, wherein calculating the Latent Dirichlet Allocation model according to the preset initial first hyperparameter, the preset initial second hyperparameter, the preset initial number of topics, the preset initial global count matrix of documents and topics, and the preset initial global count matrix of topics and words, to obtain the probability distribution between documents and topics and the probability distribution between topics and words comprises:

segmenting, by a master calculation apparatus, a document set into a plurality of document subsets, and setting the initial first hyperparameter, the initial second hyperparameter, the initial number of topics, the preset initial global count matrix of documents and topics, and the preset initial global count matrix of topics and words;

sending, by the master calculation apparatus, each document subset of the plurality of document subsets, the initial first hyperparameter, the initial second hyperparameter, the initial number of topics, the preset initial global count matrix of documents and topics, and the preset initial global count matrix of topics and words to each slave calculation apparatus of a plurality of slave calculation apparatuses correspondingly such that each slave calculation apparatus of the plurality of slave calculation apparatuses solves the Latent Dirichlet Allocation model and updates a local count matrix of documents and topics and a local count matrix of topics and words according to a received preset initial global count matrix of documents and topics, a received initial global count matrix of topics and words, the received initial first hyperparameter, the received initial second hyperparameter, and the received initial number of topics;

receiving, by the master calculation apparatus, the local count matrix of documents and topics and the local count matrix of topics and words that are returned by each slave calculation apparatus, and performing merging to obtain a global count matrix of documents and topics and a global count matrix of topics and words;

determining, by the master calculation apparatus, whether a process of solving, by each slave calculation apparatus, the Latent Dirichlet Allocation model and updating the local count matrix of documents and topics and the local count matrix of topics and words converges, and when the process of solving the Latent Dirichlet Allocation model and updating the local count matrix of documents and topics and the local count matrix of topics and words does not converge, sending the global count matrix of documents and topics and the global count matrix of topics and words to each slave calculation apparatus correspondingly for calculation, and continuing to update the local count matrix of documents and topics and the local count matrix of topics and words until the process of solving the Latent Dirichlet Allocation model and updating the local count matrix of documents and topics and the local count matrix of topics and words converges, and outputting the global count matrix of documents and topics and the global count matrix of topics and words that are eventually obtained; and calculating, by the master calculation apparatus, the probability distribution between documents and topics and the probability distribution between topics and words according to the global count matrix of documents and topics and the global count matrix of topics and words.

2. The method according to claim 1, wherein determining whether the first hyperparameter, the second hyperparameter, and the number of topics converge, and when the first hyperparameter, the second hyperparameter, and the number of topics do not converge, putting the first hyperparameter, the second hyperparameter, and the number of topics into the Latent Dirichlet Allocation model for calculation comprises determining, by the master calculation apparatus, whether the first hyperparameter, the second hyperparameter, and the number of topics converge, and when the first hyperparameter, the second hyperparameter, and the number of topics do not converge, sending the first hyperparameter, the second hyperparameter, and the number of topics to each slave calculation apparatus such that each slave calculation apparatus puts the first hyperparameter, the second hyperparameter, and the number of topics into the Latent Dirichlet Allocation model for local calculation.

3. A parameter inference calculation apparatus based on a Latent Dirichlet Allocation model, comprising:
   a receiver;
   a plurality of processors; and
   a memory unit implemented by hardware,
   wherein the plurality of processors comprise a master processor and one or more slave processors,
   wherein the receiver is configured to receive a document set,
   wherein the master processor is configured to:
      segment the document set into a plurality of document subsets;
      set an initial first hyperparameter, an initial second hyperparameter, the initial number of topics, an initial global count matrix of documents and topics, and an initial global count matrix of topics and words;
      send to each slave processor a document subset, the initial first hyperparameter, the initial second hyperparameter, the initial number of topics, the initial global count matrix of documents and topics, and the initial global count matrix of topics and words;
      receive from each slave processor a local count matrix of documents and topics and a local count matrix of topics and words, and perform merging to obtain a global count matrix of documents and topics and a global count matrix of topics and words;
      determine, for each slave processor, whether the slave processor solves the Latent Dirichlet Allocation model and updates the local count matrix of documents and topics and the local count matrix of topics and words converges, and when the process of solving the Latent Dirichlet Allocation model and updating the local count matrix of documents and topics and the local count matrix of topics and words does not converge, send the global count matrix of documents and topics and the global count matrix of topics and words to the slave processor for calculation, and continue to update the local count matrix of documents and topics and the local count matrix of topics and words until the process of calculating the Latent Dirichlet Allocation model and updating the local count matrix of documents and topics and the local count matrix of topics and words converges, and output the global count matrix of documents and topics and global count matrix of topics and words that are eventually obtained;
      obtain, through calculation, a probability distribution between documents and topics and a probability distribution between topics and words according to the global count matrix of documents and topics and the global count matrix of topics and words;
      obtain, by using an expectation maximization algorithm, a first hyperparameter, a second hyperparameter, and the number of topics that maximize log likelihood functions of the probability distributions;
      determine, for each slave processor, whether the first hyperparameter, the second hyperparameter, and the number of topics converge, and when the first hyperparameter, the second hyperparameter, and the number of topics do not converge, send the first hyperparameter, the second hyperparameter, and the number of topics to the slave processor until an optimal first hyperparameter, an optimal second hyperparameter, and the optimal number of topics that maximize the log likelihood functions of the probability distributions converge, and output the probability distributions, the optimal first hyperparameter, the optimal second hyperparameter, and the optimal number of topics that are eventually obtained, and
   wherein each slave processor is configured to:
      receive the document subset, the initial first hyperparameter, the initial second hyperparameter, the initial number of topics, the initial global count matrix of documents and topics, and the initial global count matrix of topics and words that are sent by the master processor, calculate the Latent Dirichlet Allocation model, update the local count matrix of documents and topics and the local count matrix of topics and words, and return the local count matrix of documents and topics and the local count matrix of topics and words to the master processor;
      receive the global count matrix of documents and topics, the global count matrix of topics and words, the first hyperparameter, the second hyperparameter, and the number of topics that are sent by the master processor and put them into the Latent Dirichlet Allocation model for local calculation, and
   wherein the memory unit is configured to store the document set, the initial first hyperparameter, the initial second hyperparameter, the initial number of topics, the initial global count matrix of documents and topics, the initial global count matrix of topics and words, the local count matrices of documents and topics, the local count matrices of topics and words, the global count matrix of documents and topics, and the global count matrix of topics and words.

4. The calculation apparatus according to claim 3, wherein the master processor comprises:
   an initialization unit configured to:
      segment the document set into the plurality of document subsets; and
      set the initial first hyperparameter, the initial second hyperparameter, the initial number of topics, the initial global count matrix of documents and topics, and the initial global count matrix of topics and words;
   a parameter estimation unit configured to:
      construct the log likelihood functions of the probability distributions;
      obtain, by using the expectation maximization algorithm, the first hyperparameter, the second hyperparameter, and the number of topics that maximize the log likelihood functions of the probability distributions;
      determine whether the first hyperparameter, the second hyperparameter, and the number of topics converge, and when the first hyperparameter, the second hyperparameter, and the number of topics do not converge, send, through a first data transceiver unit, the first hyperparameter, the second hyperparameter, and the number of topics to the slave processor calculation apparatus, until the optimal first hyperparameter, the optimal second hyperparameter, and the optimal number of topics that maximize the log likelihood functions of the probability distributions converge, and output the probability distributions, the optimal first hyperparameter, the optimal second hyperparameter, and the optimal number of topics that are eventually obtained;
   a Latent Dirichlet Allocation model calculation unit configured to:
      merge a plurality of local count matrixes of documents and topics and local count matrixes of topics and words that are received through the first data transceiver unit to obtain the global count matrix of documents and topics and the global count matrix of topics and words;

determine whether a process of solving, by each slave processor, the Latent Dirichlet Allocation model and updating the local count matrix of documents and topics and the local count matrix of topics and words converges, and when the process of solving the Latent Dirichlet Allocation model and updating the local count matrix of documents and topics and the local count matrix of topics and words does not converge, send the global count matrix of documents and topics and the global count matrix of topics and words to each slave processor for calculation, and continue to update the local count matrix of documents and topics and the local count matrix of topics and words until the process of calculating the Latent Dirichlet Allocation model and updating the local count matrix of documents and topics and the local count matrix of topics and words converges, and output the global count matrix of documents and topics and global count matrix of topics and words that are eventually obtained; and obtain, through calculation, the probability distribution between documents and topics and the probability distribution between topics and words according to the global count matrix of documents and topics and the global count matrix of topics and words; and the first data transceiver unit configured to:

send each document subset of a plurality of document subsets, the initial first hyperparameter, the initial second hyperparameter, the initial number of topics, the initial global count matrix of documents and topics, and the initial global count matrix of topics and words to each slave processor correspondingly;

receive the local count matrix of documents and topics and the local count matrix of topics and words that are returned by each slave processor;

send the global count matrix of documents and topics and the global count matrix of topics and words to each slave processor; and send the first hyperparameter, the second hyperparameter, and the number of topics to each slave processor.

5. The calculation system apparatus according to claim 4, wherein the slave processor comprises:

a second data transceiver unit configured to:

receive the document subset, the initial first hyperparameter, the initial second hyperparameter, the initial number of topics, the initial global count matrix of documents and topics, and the initial global count matrix of topics and words that are sent by the master processor;

send the local count matrix of documents and topics and the local count matrix of topics and words to the master processor;

receive the global count matrix of documents and topics and the global count matrix of topics and words that are sent by the master processor; and receive the first hyperparameter, the second hyperparameter, and the number of topics that are sent by the master processor; and a Latent Dirichlet Allocation model local calculation unit configured to:

calculate the Latent Dirichlet Allocation model and perform update to obtain the local count matrix of documents and topics and the local count matrix of topics and words according to the document subset, the initial first hyperparameter, the initial second hyperparameter, the initial number of topics, the initial global count matrix of documents and topics, and the initial global count matrix of topics and words that are received through the second data transceiver unit;

put the global count matrix of documents and topics and the global count matrix of topics and words that are received through the second data transceiver unit into the Latent Dirichlet Allocation model for local calculation; and put the first hyperparameter, the second hyperparameter, and the number of topics that are received through the second data transceiver unit into the Latent Dirichlet Allocation model for local calculation.

* * * * *

UNITED STATES PATENT AND TRADEMARK OFFICE
CERTIFICATE OF CORRECTION

PATENT NO. : 9,213,943 B2  
APPLICATION NO. : 14/153257  
DATED : December 15, 2015  
INVENTOR(S) : Kopylov Vladislav et al.

Page 1 of 1

It is certified that error appears in the above-identified patent and that said Letters Patent is hereby corrected as shown below:

IN THE CLAIMS

Column 18, Line 3, Claim 5 should read:

The calculation apparatus according to claim 4, wherein the slave processor comprises:
 a second data transceiver unit configured to:
 receive the document subset, the initial first hyperparameter, the initial second hyperparameter, the initial number of topics, the initial global count matrix of documents and topics, and the initial global count matrix of topics and words that are sent by the master processor;
 send the local count matrix of documents and topics and the local count matrix of topics and words to the master processor;
 receive the global count matrix of documents and topics and the global count matrix of topics and words that are sent by the master processor; and
 receive the first hyperparameter, the second hyperparameter, and the number of topics that are sent by the master processor; and
 a Latent Dirichlet Allocation model local calculation unit configured to:
 calculate the Latent Dirichlet Allocation model and perform update to obtain the local count matrix of documents and topics and the local count matrix of topics and words according to the document subset, the initial first hyperparameter, the initial second hyperparameter, the initial number of topics, the initial global count matrix of documents and topics, and the initial global count matrix of topics and words that are received through the second data transceiver unit;
 put the global count matrix of documents and topics and the global count matrix of topics and words that are received through the second data transceiver unit into the Latent Dirichlet Allocation model for local calculation; and
 put the first hyperparameter, the second hyperparameter, and the number of topics that are received through the second data transceiver unit into the Latent Dirichlet Allocation model for local calculation.

Signed and Sealed this  
Twelfth Day of April, 2016

Michelle K. Lee  
*Director of the United States Patent and Trademark Office*